(12) United States Patent
Ihle et al.

(10) Patent No.: US 8,171,199 B2
(45) Date of Patent: May 1, 2012

(54) MULTIPROCESSOR GATEWAY

(75) Inventors: Markus Ihle, Jettenburg (DE); Tobias Lorenz, Schwieberdingen (DE); Jan Taube, Reutlingen (DE); Stefan Bleeck, Hohenfelde (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/227,261

(22) PCT Filed: Apr. 17, 2007

(86) PCT No.: PCT/EP2007/053732
§ 371 (c)(1),
(2), (4) Date: Mar. 10, 2009

(87) PCT Pub. No.: WO2007/134922
PCT Pub. Date: Nov. 29, 2007

(65) Prior Publication Data
US 2009/0292844 A1 Nov. 26, 2009

(30) Foreign Application Priority Data

May 24, 2006 (DE) .......................... 10 2006 024 848
Nov. 24, 2006 (DE) .......................... 10 2006 055 512

(51) Int. Cl.
*G06F 13/00* (2006.01)
(52) U.S. Cl. .......................... 710/316; 370/362; 370/401
(58) Field of Classification Search .................... 710/52, 710/110, 306, 310, 315, 317; 370/401, 362
See application file for complete search history.

(56) References Cited

U.S. PATENT DOCUMENTS

| 6,108,739 | A | * | 8/2000 | James et al. | ................... | 710/113 |
| 7,561,571 | B1 | * | 7/2009 | Lovett et al. | .................. | 370/392 |
| 7,590,127 | B2 | * | 9/2009 | Krusche et al. | ............... | 370/401 |

FOREIGN PATENT DOCUMENTS

| DE | 198 19 569 A1 | 11/1999 |
| DE | 10 2004 033761 A1 | 2/2006 |
| JP | 2004-171194 | 6/2004 |
| WO | WO 2006/005427 | 1/2006 |

* cited by examiner

*Primary Examiner* — Glenn A Auve
(74) *Attorney, Agent, or Firm* — Kenyon & Kenyon LLP

(57) ABSTRACT

A multiprocessor gateway for multiple serial buses includes: multiple communication modules that are each provided for connection of one serial bus; multiple processors for processing data that are transferred in word-based fashion, via an internal system bus appurtenant to the respective processor, between the processor and the communication modules, the internal system buses of the multiprocessor gateway being connected to the communication modules, which have a respective appurtenant interface unit for each system bus, each processor exchanging data, via its appurtenant system bus and the interface unit, appurtenant to the system bus, of a communication module, with the serial bus connected to the communication module, independently of the other processors and without waiting time.

20 Claims, 2 Drawing Sheets

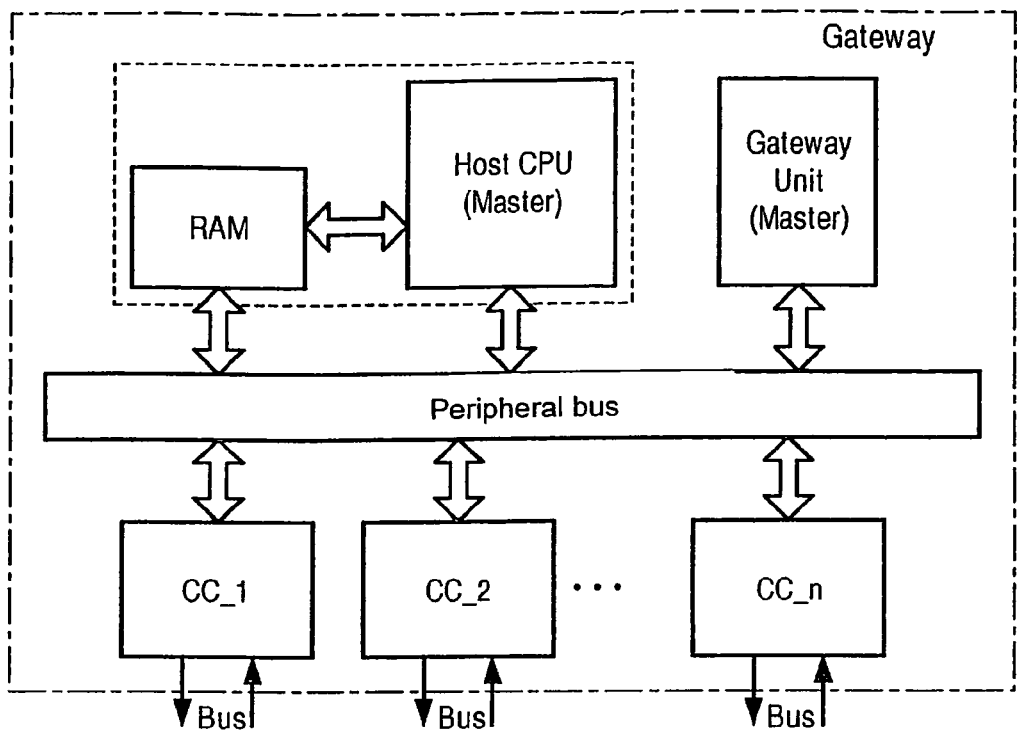
Fig. 1 (Prior art)
Fig. 2 (Prior art)
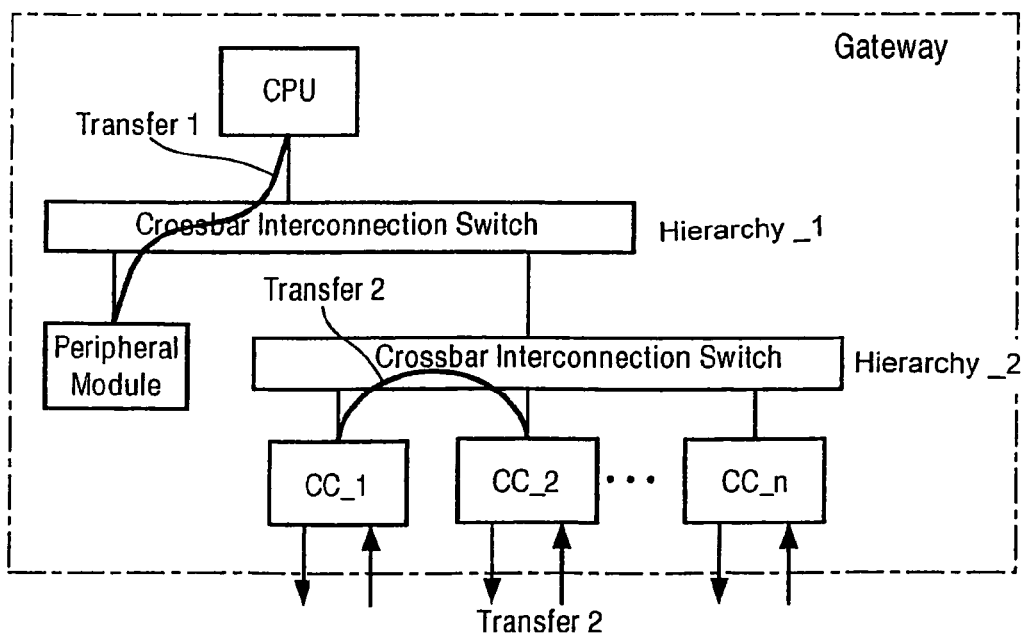

MULTIPROCESSOR GATEWAY

BACKGROUND OF THE INVENTION

1. Field of the Invention

The present invention relates to a multiprocessor gateway for multiple serial buses that transfer data in packet fashion.

2. Description of Related Art

The networking of control units, sensor apparatus, and actuators with the aid of a network or communication system made up of a communication connection, in particular a bus, and corresponding communication modules, has drastically increased in recent years in the design of modern motor vehicles or also in mechanical engineering, especially in the machine-tool sector and in automation. Synergistic effects resulting from the distribution of functions to multiple users, in particular control units, can be achieved in this context. The term used is "distributed systems." Such distributed systems or networks are thus made up of the users and the bus system or multiple bus systems connecting those users. Communication between different stations or users is thus taking place more and more via a communication system, bus system, or network of this kind, over which the data to be transferred are transmitted in messages. This communication traffic on the bus system, access and receiving mechanisms, and error handling are regulated by a corresponding protocol, the name of the respective protocol often being used (as it also is here) as a synonym for the network or bus system itself.

In the automotive sector, for example, the controller area network (CAN) bus has become established as a protocol. This is an event-controlled protocol, i.e. protocol activities such as the sending of a message are initiated by events that originate outside the communication system. Unique access to the communication system or bus system is resolved by priority-based bit arbitration. A prerequisite for this is that a priority be assigned to the data being transferred, and thus to each message. The CAN protocol is very flexible, and it is thus easy to insert further users and messages as long as free priorities (message identifiers) still exist. The totality of all the messages to be sent in the network, with priorities and with their transmitting and receiving users and the corresponding communication modules, are stored in a list called the communication matrix.

An alternative approach to event-controlled, spontaneous communication is the exclusively time-controlled approach. All communication activities on the bus are strictly periodic. Protocol activities such as the sending of a message are triggered only by the passage of a time that applies to the bus system. Access to this medium is based on the apportioning of time regions in which a transmitter has an exclusive transmission right. As a rule, the message sequence must already be defined before initial startup. A schedule is therefore drawn up that meets the messages' requirements in terms of repetition rate, redundancy, deadlines, etc. This is called a "bus schedule." One such bus system is, for example, TTP/C.

The advantages of both aforesaid bus types are combined in the time-controlled CAN approach, called TTCAN (time-triggered controller area network). This meets the requirements outlined above for time-controlled communication, and the requirements for a certain degree of flexibility. TTCAN achieves this by constructing the communication round in "exclusive" time windows for periodic messages of specific communication users, and in "arbitrating" time windows for spontaneous messages of multiple communication users. TTCAN is based substantially on a time-controlled, periodic communication that is timed, with the aid of a time-reference message, by a user or communication module (called the "time master") that defines the principal time.

A further possibility for combining different transfer types is offered by the FlexRay protocol, which describes a fast, deterministic, and fault-tolerant bus system for use in particular in a motor vehicle. This protocol operates with the time division multiple access (TDMA) method, in which the users and the messages to be transferred are allocated fixed time slots in which they have exclusive access to the communication connection (the bus). The time slots repeat in a defined cycle, so that the point in time at which a message is transferred via the bus can be predicted exactly, and bus access occurs deterministically. For optimum utilization of the bandwidth for message transfer on the bus system, the cycle is subdivided into a static and a dynamic part. The fixed time slots are located in the static part at the beginning of a bus cycle. In the dynamic part, the time slots are assigned dynamically, and exclusive bus access therein is enabled for only a short time in each case. If no access occurs, access is authorized for the next user. This time span is referred to as a "mini-slot," in which the system waits for access by the first user.

As just presented, a plurality of different transfer technologies, and therefore types of bus systems or networks, exist. It is often the case that multiple bus systems of the same or different types must be connected to one another. This purpose is served by a bus interface unit, called a "gateway." A gateway is therefore an interface between different buses, which can be of the same or different types: the gateway forwards messages from one bus to one or more other buses. Known gateways are made up of multiple independent communication modules; the exchange of messages occurs via the processor interface (CPU interface) of the respective user or the corresponding interface module of the respective communication module. This CPU interface is heavily loaded by this data exchange in addition to the messages to be transferred to the user itself; in combination with the transfer structure resulting therefrom, this results in a relatively low data transfer speed. Integrated communication controllers or communication modules, which share a common message memory (also called message RAM) in order thereby to compensate for structural disadvantages, also exist. Integrated communication modules of this kind are, however, therefore very inflexible in terms of data transfer, and in particular are defined for a specific number of bus connections and usually also for the same bus system.

FIG. 1 shows a bus system according to the existing art. The bus system contains multiple communication modules or communication controllers (CC), to which serial data buses can be connected. The multiprocessor gateway depicted in FIG. 1 contains an internal system bus or peripheral bus to which, in addition to the communication modules, a host CPU and a so-called gateway unit, which represents a second processor, are connected. Communication within the multiprocessor gateway occurs in accordance with the master/slave principle: the communication modules operate as slave units, and the host CPU and the gateway unit function as master units. The communication modules, constituting slave units, do not themselves initiate a data transfer, but do so only when prompted by a master.

The host CPU configures, monitors, and controls the individual communication modules CC. The CPU reads received messages, processes them, and generates new messages. The CPU also handles the delivery of messages. In a simple gateway situation, for example, it is often necessary merely to read out the data received from a communication module and write it into one or more other communication modules for delivery. If a DMA controller is not used, the host CPU transfers the data in word-based fashion from the communication module into the data memory RAM or into a CPU-internal memory. The data are then processed and transferred into corresponding communication modules. The data memory RAM contains not only the data but also a program code that is executed by the CPU. In the data memory RAM the data are stored, for example, in the form of message objects or messages of communication modules CC for further processing by the CPU.

Communication modules CC represent the data connection from the multiprocessor gateway to the individual bus systems, i.e. to the serial buses. In a conventional multiprocessor gateway, the communication modules each have a message memory. The messages that are received and are to be delivered via the bus are deposited in the message memory. The host CPU can access the message memory, and the data objects contained therein, via a passive interface.

The peripheral bus or system bus serves to connect the individual components with one another. Under the control of the bus master, data are written into, and read out from, modules. The gateway unit handles control of the gateway functions. The gateway unit can be constituted, for example, by a coprocessor that controls internal message transfer. The gateway serves to relieve the load on the host CPU. The gateway functions taken on by the gateway unit encompass, for example, message processing, comparison and combination of new messages, and message delivery. These functions are performed by the gateway unit as bus master. The transfer bandwidth of the system bus is divided between the two master units, i.e. between the gateway unit and the bus master.

Depending on the complexity and number of masters, hierarchical bus systems can also be used in the peripheral bus or system bus.

FIG. 2 shows, by way of example, a hierarchical bus system having two hierarchical levels (Crossbar Interconnection Switches). The hierarchical structure of the bus system in the multiprocessor gateway depicted in FIG. 2 allows multiple internal data transfers to be performed simultaneously, provided the data transfer does not take place between the two hierarchical planes. In the example depicted in FIG. 2, one data transfer is occurring in hierarchical plane 1 between the CPU and the peripheral module, and a second data transfer is occurring between two communication modules on another hierarchical plane.

In conventional multiprocessor gateways, the data transfer bandwidth of the system bus or of a hierarchically structured bus system is divided between the bus masters. Different access methods are used in this context. For example, the same transfer bandwidth is allocated to each of the various bus masters. Alternatively, different master units can be allocated different priorities, and the master unit having the higher priority, e.g. the host CPU, takes precedence for data transfer.

Conventional multiprocessor gateways therefore have the disadvantage that a master unit must constantly wait until an internal data transfer can be executed. Access conflicts occur when different masters want to access the common system bus simultaneously. This increases latency times or waiting times for internal data transfer. For example, if the gateway unit is using the system bus for a data transfer, the host CPU itself experiences wait cycles until it can once again access data in a peripheral module or a communication module, or other memories. While a master's data transfer is in progress, another master unit therefore cannot access peripheral modules. During this waiting time, the host CPU also cannot perform any data processing operations.

BRIEF SUMMARY OF THE INVENTION

It is an object of the present invention to provide a multiprocessor gateway that enables parallel data transfers by different masters without waiting times.

The invention provides a multiprocessor gateway having multiple serial buses that transfer data in packet fashion, the multiprocessor gateway having:
  multiple communication modules that are each provided for connection of one serial bus;
  multiple processors for processing data that are transferred in word-based fashion, via an internal system bus appurtenant to the respective processor, between the processor and the communication modules, the internal system buses of the multiprocessor gateway being connected to the communication modules, which have a respective appurtenant interface unit for each system bus, each processor exchanging data, via its appurtenant system bus and the interface unit, appurtenant to the system bus, of a communication module, with the serial bus connected to the communication module, independently of the other processors and without waiting time.

In an example embodiment of the multiprocessor gateway according to the present invention, each communication module has:
  a communication protocol unit, connected to the serial bus, for converting between data packets and messages that are each made up of multiple data words;
  a message forwarding unit for forwarding messages between at least one message memory and the communication protocol unit and buffer memories;
  multiple interface units that are each connected to an appurtenant system bus of the multiprocessor gateway, each interface unit being connected to at least one appurtenant buffer memory that buffers a message, a transfer of data words taking place, via multiple system buses and their appurtenant interface units, from and to the buffer memories of the interface units, isochronously without a waiting time.

In an embodiment of the multiprocessor gateway according to the present invention, the serial bus is an Ethernet bus.

In a further embodiment of the multiprocessor gateway according to the present invention, the serial bus is a field bus.

In an alternative embodiment of the multiprocessor gateway according to the present invention, the field bus is a CAN bus.

In a further embodiment of the multiprocessor gateway according to the present invention, the field bus is a FlexRay bus.

In a further embodiment of the multiprocessor gateway according to the present invention, the field bus is a MOST bus.

In a further embodiment of the multiprocessor gateway according to the present invention, the field bus is a LIN bus.

In an embodiment of the multiprocessor gateway according to the present invention, each processor constitutes a bus master for its appurtenant system bus.

In a further embodiment of the multiprocessor gateway according to the present invention, the communication modules constitute slave units for the system buses.

In an embodiment of the multiprocessor gateway according to the present invention, each system bus has a data bus, an address bus, and a control bus.

In an embodiment of the multiprocessor gateway according to the present invention, a data processing unit connected to the system buses is designed as a processor that controls a data transfer between the serial buses connected to the communication module.

In a further embodiment, a data processing unit connected to the system buses is embodied as a coprocessor that controls a data transfer between the serial buses connected to the communication module.

In an alternative embodiment, a data processing unit connected to the system buses is embodied as an FSM that controls a data transfer between the serial buses connected to the communication module.

BRIEF DESCRIPTION OF THE SEVERAL VIEWS OF THE DRAWING

FIG. 1 shows a gateway according to the existing art.

FIG. 2 shows a gateway having a hierarchical system bus, according to the existing art.

DETAILED DESCRIPTION OF THE INVENTION

Figure 3:
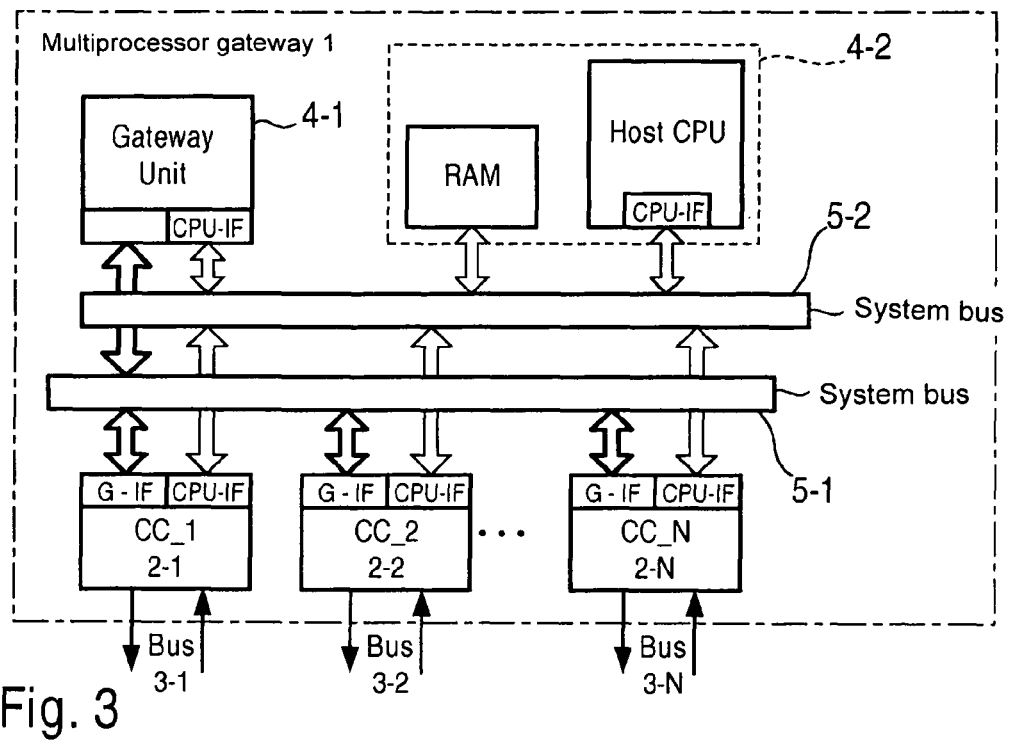
FIG. 3 shows an embodiment of the multiprocessor gateway according to the present invention.

As may be seen from FIG. 3, multiprocessor gateway 1 according to the present invention has multiple communication modules 2-1, 2-2, 2-n. Each communication module 2-i is provided respectively for connection of one serial bus 3-i. Multiprocessor gateway 1 contains multiple processors 4-i for processing data. In the embodiment depicted in FIG. 3, first processor 4-1 constitutes a gateway unit that coordinates message transfer between serial buses 3-i. A further processor 4-2 contains a CPU (central processing unit) and a data and instruction memory RAM. Each processor 4-1, 4-2 of multiprocessor gateway 1 according to the present invention has an appurtenant internal system bus. In the embodiment depicted in FIG. 3, gateway unit 4-1 has a system bus 5-1, and processor 4-2 has a system bus 5-2. Whereas gateway unit 1 coordinates message transfer between buses 3-i, the actual data processing is accomplished by the host CPU of processor 4-2. In an embodiment, the two system buses 5-1, 5-2 encompass an address bus, a data bus, and a control bus. Gateway unit 1 is connected via a gateway interface to system bus 5-1, and via a CPU interface to system bus 5-2. The host CPU of processor 4-2 is connected via a CPU interface to system bus 5-2. Gateway unit 4-1 and data processing processor 4-2 operate as bus masters of their respective system bus. Communication modules 2 operate as slave units and, in the embodiment depicted in FIG. 3, are connected to both system buses via an appurtenant interface unit. The number of system buses 5-i used in multiprocessor gateway 1 corresponds to the number of master units 4-i. In further embodiments of multiprocessor gateway 1 according to the present invention, more than two master units can also be provided, each master unit receiving an appurtenant system bus 5-i. Multiprocessor gateway 1 according to the present invention thus embodies a multiple networking concept.

Figure 4:
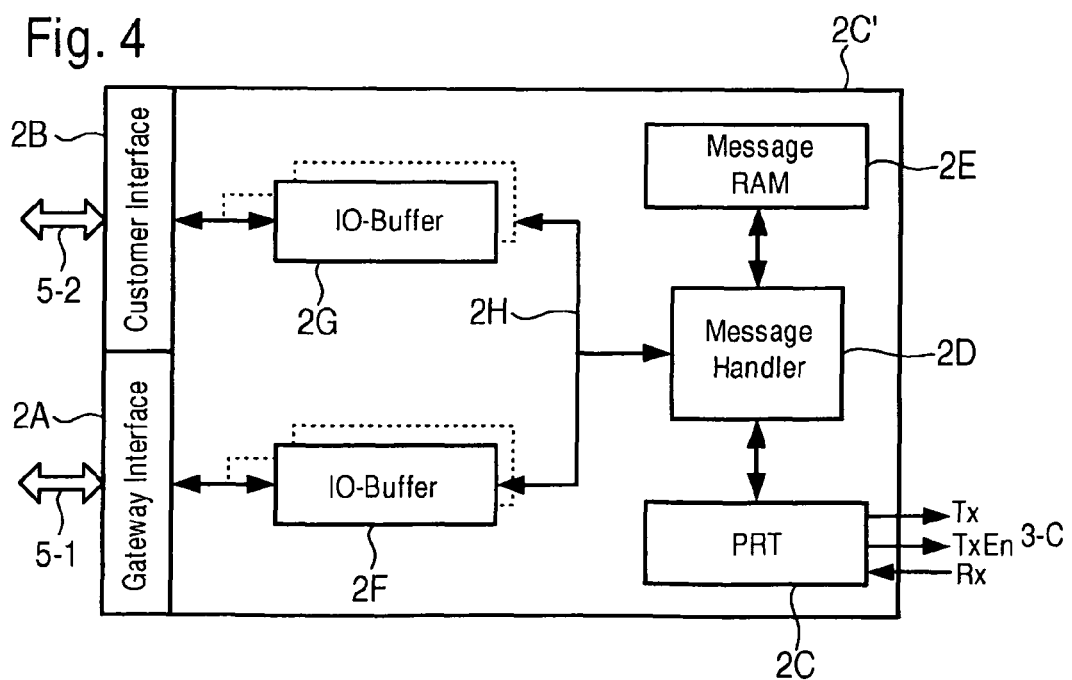
FIG. 4 is a block diagram of a possible embodiment of a communication module contained in the multiprocessor gateway according to the present invention.

FIG. 4 shows one possible embodiment of a communication module 2-i used in multiprocessor gateway 1 according to the present invention. Communication module 2 has a gateway interface 2A and a customer interface 2B. Gateway interface 2A constitutes the interface from communication module 2 to system bus 5-1 of gateway unit 4-1. Customer interface 2B constitutes the interface of communication module 2 with system bus 5-2 of data processing unit 4-2. The communication module furthermore contains a communication protocol unit 2C, connected to serial bus 3, for converting between data packets DP that are transferred via the serial bus, and messages that are each made up of one or more data words DW.

Communication module 2-i further contains a message forwarding unit 2D for forwarding messages between at least one message memory 2E and communication protocol unit 2C. Message forwarding unit 2D moreover serves to forward messages between message memory 2E, communication protocol unit 2C, and buffer memories 2F, 2G. Each interface unit 2A, 2B has at least one respective appurtenant buffer memory. In the embodiment depicted in FIG. 4, gateway interface 2A contains buffer memory 2F, and customer interface 2B contains buffer memory 2G. The buffer memories serve to buffer messages. Internally, messages are transferred between buffer memories 2F, 2G and message forwarding unit 2D via data lines 2H. Communication module 2 represents the connection from master gateway 1 to an appurtenant serial bus 3-i. Serial bus 3-i can be, for example, an Ethernet bus or a field bus; the field bus can be a CAN bus, a FlexRay bus, a MOST bus, or a LIN bus.

In an embodiment of multiprocessor gateway 1 according to the present invention, each processor 4-i constitutes a bus master for its appurtenant system bus 5-i. In an alternative embodiment, it is possible for each system bus 5-i to have more than one bus master 4-i. The number of interface units of communication module 2 preferably corresponds to the number of system buses 5-i used in multiprocessor gateway 1. In the embodiment depicted in FIG. 4, communication module 2-i has two interface units 2A, 2B and respectively appurtenant buffer memories 2F, 2G. Data can be written into the communication module, and read out therefrom, in parallel fashion via both interface units 2A, 2B. Data arbitration is accomplished, in multiprocessor gateway 1 according to the present invention, inside communication module 2. In the communication module, buffer memory 2F that is connected via gateway interface 2A to system bus 5-1 can be used for data transfer within a gateway operation of gateway unit 4-1 without influencing host CPU 4-2. Gateway bus or system bus 5-1, whose bus master is constituted by gateway unit 4-1, serves, like the CPU bus or system bus 5-2 whose bus master is constituted by processor 4-2, for internal data transfer between two communication modules 2-i. In multiprocessor gateway 1 according to the present invention, internal data transfer occurs in word-based fashion via data lines of the respective system bus 5-i. The data are transferred in parallel fashion via the data lines of the data bus that forms part of system bus 5-i, the word width corresponding to the bus width of the respective data bus. Whereas internal data transfer takes place in word-based fashion, data are transferred via external serial data buses 3-i in packet fashion, each data packet DP in turn encompassing header or administrative data as well as payload or useful data. Communication protocol units 2C respectively contained in communication modules 2-i perform the conversion between data packets DP and messages MSG, each message MSG being respectively made up of one or more data words DW. When communication protocol unit 2C receives data packets DP, the latter are converted into internal messages MSG and, for example, buffered in message buffer memory 2E. Data words DW of message MSG are then transferred via message forwarding unit 2D into a buffer memory 2F, 2G. In one possible embodiment, the memory capacity of the buffer memories respectively corresponds to the word width of at least one data word DW. The transfer of data words DW via system buses 5-i and their appurtenant interface units from and to buffer memories 2F, 2G occurs isochronously without waiting time.

In one possible embodiment, the various system buses 5-1, 5-2 of multiprocessor gateway 1 are designed differently. Because of the specific use of gateway bus 5-1, for example, this system may be configured in minimal fashion. System bus 5-1 or gateway bus 5-1 then has only a minimal address and data width, as well as a small number of control lines.

One advantage of multiprocessor gateway 1 according to the present invention is that the load on CPU system bus 5-2 is reduced, since data transfer for the transmission of data between a first communication module 2-*i* having serial data bus 3-*i* connected thereto, and a second communication module 2-*j* having serial data bus 3-*j* connected thereto, is accomplished via the separate gateway bus 5-1. As a result, the host CPU of processor 4-2 can work without delay or waiting times, and every reaction of multiprocessor gateway 1 is easily predictable, i.e. it does not depend on the load resulting from the external data flow of the various serial buses 3-*i*. In multiprocessor gateway 1 according to the present invention, the latency times for data transfer between communication modules 2 are minimized, and the latency time for transferring messages between two external serial bus systems, for example a CAN field bus and a FlexRay bus, is therefore also minimized.

What is claimed is:

1. A multiprocessor gateway for multiple serial buses which transfer data in packet fashion, comprising:
    multiple communication modules, wherein each of the communication modules is connected to a corresponding one of the serial buses; and
    multiple processors, wherein each of the processors is configured to process data transferred via an internal system bus appurtenant to each respective one of the processors, and wherein the data are transferred between the processors and the communication modules;
    wherein the internal system bus of each of the multiple processors are connected to the communication modules, and wherein each communication module has at least one interface unit associated with each system bus; and
    wherein each processor exchanges data of a communication module, via the appurtenant system bus and the at least one interface unit associated with the appurtenant system bus, independently of the other processors, and
    wherein the plurality of system buses corresponds to the number of multiple processors.

2. The multiprocessor gateway as recited in claim 1, wherein each communication module includes:
    a communication protocol unit connected to the serial bus, the communication protocol unit converting between data packets and messages that are each made up of multiple data words;
    a message forwarding unit forwarding messages between at least one message memory and one of (a) the communication protocol unit and (b) buffer memories; and
    multiple interface units each connected to an appurtenant system bus of the multiprocessor gateway, each interface unit being connected to at least one appurtenant buffer memory that buffers a message;
    wherein a transfer of data words occurs from and to the buffer memories via multiple system buses and the appurtenant interface units, isochronously.

3. The multiprocessor gateway as recited in claim 1, wherein at least one of the multiple serial buses is an Ethernet bus.

4. The multiprocessor gateway as recited in claim 1, wherein at least one of the multiple serial buses is a field bus.

5. The multiprocessor gateway as recited in claim 4, wherein the field bus is a CAN bus.

6. The multiprocessor gateway as recited in claim 4, wherein the field bus is a FlexRay bus.

7. The multiprocessor gateway as recited in claim 4, wherein the field bus is a MOST bus.

8. The multiprocessor gateway as recited in claim 4, wherein the field bus is a LIN bus.

9. The multiprocessor gateway as recited in claim 1, wherein each processor is a bus master for the appurtenant internal system bus.

10. The multiprocessor gateway as recited in claim 1, wherein the communication modules are slave units for the system buses.

11. The multiprocessor gateway as recited in claim 1, wherein each system bus includes a data bus, an address bus, and a control bus.

12. The multiprocessor gateway as recited in claim 1, wherein a processor connected to the system buses controls a data transfer between the serial buses connected to the communication modules.

13. The multiprocessor gateway as recited in claim 1, wherein a processor connected to the system buses is a coprocessor that controls a data transfer between the serial buses connected to the communication module.

14. The multiprocessor gateway as recited in claim 1, wherein a processor configured as a Finite State Machine (FSM) and connected to the system buses controls a data transfer between the serial buses connected to the communication module.

15. The multiprocessor gateway as recited in claim 1, wherein each processor is a bus master for the appurtenant internal system bus, wherein the communication modules are slave units for the system buses.

16. The multiprocessor gateway as recited in claim 1, wherein each system bus includes a data bus, an address bus, and a control bus, and wherein a processor connected to the system buses controls a data transfer between the serial buses connected to the communication modules.

17. The multiprocessor gateway as recited in claim 1, wherein each system bus includes a data bus, an address bus, and a control bus, and wherein a processor connected to the system buses is a coprocessor that controls a data transfer between the serial buses connected to the communication module.

18. The multiprocessor gateway as recited in claim 1, wherein each processor is a bus master for the appurtenant internal system bus, wherein the communication modules are slave units for the system buses, wherein each system bus includes a data bus, an address bus, and a control bus, and wherein a processor connected to the system buses controls a data transfer between the serial buses connected to the communication modules.

19. The multiprocessor gateway as recited in claim 18, wherein the serial bus is an Ethernet bus.

20. The multiprocessor gateway as recited in claim 18, wherein the serial bus is a field bus, which is one of a CAN bus, a FlexRay bus, a MOST bus, and a LIN bus.

* * * * *